3,314,425
REINFORCED ABSORBENT PAD AND METHOD OF MAKING

Sydney Coppick, Ridley Park, Pa., assignor to Scott Paper Company, Philadelphia, Pa., a corporation of Pennsylvania
No Drawing. Filed Oct. 29, 1963, Ser. No. 319,694
13 Claims. (Cl. 128—156)

This invention relates to a novel absorbent pad, more specifically, it relates to a soft and reasonably strong pad capable of rapid absorption of fluids; such as, water and blood. Further, the invention relates to the preparation of soft, strong, highly-absorbent material suitable for applications; such as, surgical pads, adhesive bandages, sanitary napkins and the like.

Most prior art bandage and absorbent-pad materials have been made from guaze-encased cellulose or rayon fluff and like materials. Synthetic materials have heretofore found little application in absorbent pads. For the most part, inherent hydrophobicity of the majority of synthetics has caused the lack of prior application; such as, in bandages. In my copending application, Serial No. 87,743, filed February 8, 1961, issued March 17, 1964 as U. S. Patent No. 3,125,621, it has been disclosed how an inherently hydrophobic synthetic material unexpectedly can be altered to render it hydrophilic. In addition, the synthetic material used in the novel bandages may be easily presterilized, treated to render sterile or heated to sterilizing temperatures without detrimental effects.

This application differs from the above parent application by the further modification of the material to render it more widely applicable in uses; such as, bandages and catamenial pads.

As mentioned in the prior application, a reticulated, urea-formaldehyde structure is cured and dried. By specifically controlled conditions of moisture content, temperature, pressure, time and compressing surfaces, these materials are processed to improve their softness and hydrophilicity. In order to further improve the characteristics of the novel material in applications, such as, tension bandages, catamenial pads, and the like, without further support from a covering or wrapping material, tensile properties of the pad need to be improved.

Consequently, the invention is directed in one of its aspects to the simultaneous achievement of an absorbent pad and a strengthening of the highly absorbent pad.

It has now been found that to carry out the accomplished invention it is necessary that the reinforcing material and its adhesive have the following characteristics. First, the adhesive and material should not interfere or detrimentally detract from the absorbtion rate and capacity of the pad. Neither should the material or its adhesive affect the softness of the pad or bandage. Secondly the thermal sensitivity of the adhesive should be operative under the specific conditions required to impart the softness and hydrophilicity of the urea-formaldehyde component of the pad. Thirdly, the adhesive should form a strong, non-tacky bond between the reinforcing material and the reticulated foamed structure.

Although it has been found that many materials may be used to bond urea-formaldehyde foamed structures to fabrics, paper, scrims, gauzes, etc., for the most part, they do not satisfy all the requirements listed above. However, it has been unexpectedly found that the bonding, softening and water-absorbing characteristic can be imparted at the same time by use of a certain class of heat sensitive adhesives.

The type of adhesives found most applicable to this invention are those adaptable simultaneously to the conditions necessary for the softening of and hydrophilicity-imparting properties to the foamed structure as well as providing a thermo-plastic bond by virtue of their thermal activation to a tacky material at these self-same conditions of temperature, pressure, etc., and their ability to preserve their bonding capacity at body temperatures without exhibiting tackiness. Furthermore, upon cooling to the temperatures of the human body, the adhesive should have flexible non-brittle characteristics compatible with the compressed foam and the reinforcing fibrous material. Such formulations are illustrated by the example of U.S. 2,462,029.

In the preferred embodiment of this invention, the class of adhesive exemplified by a butadiene-styrene copolymer emulsion, or butadiene-acrylonitrile copolymer, in which there is dispersed a powdered solid plasticizer, such as, a tri- or di-phenyl phosphate is particularly advantageous. These adhesives are applied to the reinforcing material, such as, gauze, scrim or strips of paper, and the water component removed by evaporation. The reinforcing material is then bonded to the urea-formaldehyde foamed structure under conditions where, at the same time, there is imparted to the composite pad the essential properties of softness and hydrophobicity. A more general type of the preferred adhesives is available and supplied by Nashua Corporation, Nashua, N.H., under the name ML-7. This adhesive is similar to those described in U.S. Patent 2,462,029. These bonding conditions will be further amplified in the examples.

The above-mentioned reinforcing material is available commercially as a gauze, scrim, leno-woven scrim, synthetic scrims of various kinds, crosslaid rayon filaments of low twist calendered and bonded at only overlaid portions of the scrim, and different scrims having a yieldable weave in one or more directions.

Reinforcing materials, such as those listed above, may be used in a sandwich construction. Alternatively, a single urea-formaldehyde slab may be compressed by attaching to both major surfaces the reinforcing materials of the same or different kind.

As a general rule, the single-surface reinforced pad will suffice in most instances. If, however, the need is for a high-tension pad for longer lasting requirements which is subjected to a considerable amount of wear, the product may require added protection by means of more dense scrim or even paper sheet or sheets and cloth in some instances.

Another reinforcing material, which has been found to be advantageous, is known in the trade as non-woven material. Non-woven materials are generally water-laid, better quality, long-fiber natural products, such as, cotton or synthetic fiber material specially fibrillated and treated to adhere to each other to simulate the natural bonding found in cellulose fibers, such as pulp. These materials are within the scope of this invention.

In order to properly bind the materials to the urea-formaldehyde foamed structure, various amounts of adhesive may be deposited on the reinforcing material. Generally, the whole scrim may be covered with the adhesive. However, spot or strip printing the adhesive on the material may be sufficient to give the necessary tensile properties to the pad.

The following examples are listed as illustrative of the invention without intending to limit the scope of the broader aspects of the present concept.

EXAMPLE I

A slab of urea-formaldehyde reticulated structure with a density of 0.4 pound per cubic foot was cut on a band saw to a thickness of ½-inch. This slab was fed into a felt-covered Nobel and Wood drum dryer in conjunction with a non-woven fabric which had been treated on one side with a heat-sensitive butadiene-styrene adhesive as described above (Nashua Corporation's product ML–7). The foamed slab and the treated non-woven fabric were fed into the dryer in a manner such that the reticulated structure was in contact was the steel face of the drum (or another felt or absorbent paper) and the adhesive-coated face of the non-woven fabric was in contact with the urea-formaldehyde foamed slab. The traveling "endless" felt held the two components in intimate contact with the drum.

The Nobel and Wood dryer was operated with an internal water temperature of 200° F., and the speed was regulated to produce a contact time of 2½ minutes. An absorbent pad was obtained which was firmly adhered to the non-woven fabric. The pad could be folded and contoured without separation of the components and had good strength properties.

EXAMPLE II

Reinforced pads were prepared as in Example I, with the exception that the internal water temperature of the drum dryer was varied. The following results were obtained for a contact time of 2½ minutes.

| Nobel and Wood Dryer Temperature, ° F. | Adhesion | Water Absorption | Softness |
|---|---|---|---|
| 150 | Poor | Fair | Fair. |
| 170 | Fair | Good | Good. |
| 200 | Good | do | Excellent. |
| 230 | Excellent | do | Do. |

It is to be noted from these data that the adhesive operates in temperature-time range consistent with that required for the preparation of a soft and absorbent pad with strong reinforcing. Furthermore, the thermal-sensitive adhesive is tacky around 200° F. and non-tacky at room temperature, i.e. 60° F.

EXAMPLE III

Reinforced laminates composed of softened and water-absorption induced reticulated structures from urea-formaldehyde foams together with a thermal-sensitive, adhesive-coated non-woven fabric were prepared as in Example I with the following exceptions.

The composite was fed to the Nobel and Wood dryer between the felt and the steel drum surface, with non-adhesive coated side of the non-woven fabric in contact with the steel drum. The internal temperature of the dryer was 230° F. and the contact time was 2½ minutes.

The foamed structure was compressed, became soft and rapidly absorbent and was strongly adhered to the non-woven fabric.

EXAMPLE IV

Pads were made as in Example III, where a number of reinforcing materials were laminated between the reticulated urea-formaldehyde structure and the adhesive backing, with the following exceptions:

(a) In several cases rayon scrim of various patterns was used.

(b) In other cases parallel rayon and cotton yarns were used.

(c) Cheese cloth was also bonded between the non-woven fabric and the foamed structure.

(d) A polyethylene scrim was also laminated in a similar manner.

(e) Strips of a print-bonded, non-woven rayon fabric were also adhered to the composite structure.

(f) A pad was also prepared by compressing the reticulated structure within a folded non-woven fabric, so that both sides of the urea-formaldehyde structure were reinforced with the reinforcing material.

In all of the above, soft, compliant pads with rapid absorption properties were prepared. These pads had very high strength characteristics and could be bound tightly in the form of a bandage, etc. on the human body.

EXAMPLE V

A latex emulsion of the type described above (butadiene-styrene plasticizer modified emulsion) was applied to a rayon non-woven fabric of the trade name "Maslin." The application of the latex was via dipping and passing between rollers to remove the excess emulsion. This was dried in the oven for 10 minutes at 220° F. Slabs of urea-formaldehyde reticulated structures ½-inch thick were placed on either side of the treated fabric and passed through the drum dryer at 220° F. for 2 minutes.

A soft, strong, absorbent pad resulted which was well bonded to the fabric.

EXAMPLE VI

A regular gauze bandage was treated with the heat sensitive latex emulsion as described in Example V and dried in an oven at 220° F. for 15 minutes.

Pads were prepared by laminating this gauze between slabs of urea-formaldehyde reticulated structures in the Nobel and Wood dryer at 210° F. for 2 minutes. Similar pads were prepared with only one slab of urea-formaldehyde in combination with the thermally sensitive adhesive-coated gauze.

These pads were soft, absorbent and strong and exhibited good conforming properties when bound tightly to various parts of the human body. They formed comfortable pads when attached to the body via surgical adhesive tape.

EXAMPLE VII

A paper towel was impregnated with a latex emulsion of the type described above (Nashua Corporation's product ML–7), and the excess emulsion removed by passing through a rubber roll wringer. The treated towel was finally dried in an oven at 220° F. for 5 minutes. A tacky sheet was obtained which lost its tackiness on cooling to room temperature.

Slabs of dried urea-formaldehyde reticulated structures were cut to ½-inch thickness and placed on either side of the treated paper towel and passed through the Nobel and Wood dryer for 2½ minutes at 190° F. A strong, absorbent pad was obtained. The pad had both good wet and dry strength and absorbed water rapidly when a 2 ml. portion was placed on its surface via a pipette. Furthermore, the pad exhibited good rapid wicking properties when cut to one-inch strips and placed with one end submerged in water. Moreover, on wetting, the pad swelled to considerably larger dimensions.

EXAMPLE VIII

A pad was made as in Example VII with the exception that only one layer of ½-inch urea-formaldehyde reticulated structure was compressed and bonded to the adhesive-treated paper towel. Moreover, the bonding and compression treatment was carried out at 220° F. for 2½ minutes.

A pad with a soft, pleasing surface was obtained. It had good water absorbency properties and wicked very readily and rapidly. The pad also had good wet and dry strength.

The dry pad was 1/16-inch thick, but swelled rapidly in water to 3/16-inch thickness, i.e., a 300% increase in volume.

EXAMPLE IX

A paper towel was treated as in Example VII and laminated to a ½-inch slab of urea-formaldehyde reticulated structure to produce a compressed and softened, highly absorbent pad via treatment on the Nobel and Wood dryer drum for 2 minutes at 220° F. This was moistened with 1 ml. of water from a pipette. The time was taken for complete absorption after all the water had been added. The following results were obtained.

| Pad: | Sorption time (1 ml.), seconds |
|---|---|
| Original slab of foam | Greater than 5,000 |
| Pad as in Example IX | 0 |

EXAMPLE X

A pad was prepared exactly as in Example IX and was cut to the following dimensions:

Length—3 inches
Width—1 inch
Total thickness—0.085 inch
Weight—0.7 gram
Area—3 square inches
Volume—0.255 cubic inch When immersed in water for 2 minutes and the excess fluid drained off, the following was recorded:

Wet weight—12.8 grams
Wet thickness—0.2 inch
Water holding ratio=wet weight/dry weight=18.3

The absorption capacity is demonstrated by the holding of 18.3 times its own weight of water.

EXAMPLE XI

A pad composed of a laminate of urea-formaldehyde reticulated structure and latex-treated (Nashua Corporation's product ML-7) paper towel was processed through the Nobel and Wood machine for 2.25 minutes at 210° F.

The pad was tested for its absorption characteristics toward human blood.

Blood from subject was dripped directly, from self-inflicted wounds, on the pad. This fresh blood was rapidly absorbed by the pad.

Older bottled human blood was dripped on the pad via a hypodermic. This was absorbed, but less rapidly than the fresh blood.

EXAMPLE XII

Samples were prepared as in each of the above eleven examples and submitted to a dry sterilization technique. This was accomplished by submitting the samples to ultraviolet rays in a Fade-Ometer (manufactured by the Atlas Electrical Devices Company) for a period of 10 minutes. The resulting samples were not deteriorated in any way and thereby retained their original physical characteristics.

What I claim is:

1. A bandage-like material suitable for fluid absorption comprising a reinforcing scrim adhesively attached to a highly-absorbent, compressed urea-formaldehyde structure, said structure being characterized by high-fluid absorbency rates and adaptability for tension contact applications.

2. A bandage and the like material suitable for rapid absorption of blood comprising a rayon-reinforcing scrim adhesively attached to a highly-absorbent, compressed urea-formaldehyde structure, said structure being characterized by high-blood absorbency rates and adaptability for tension bandaging contact.

3. A composite pad adaptable for use as a highly absorptive bandage and the like comprising a reinforcing paper sheet, a thermal-sensitive adhesive deposited on said reinforcing paper sheet, said sheet being adhesively attached by means of said heat-sensitive adhesive to a highly fluid-absorbent, compressed urea-formaldehyde structure, said structure being characterized by an absorption-holding ratio in excess of 15 times its own weight of water.

4. The method of preparing an absorbent pad adaptable for use as a bandage, sanitary napkin, or the like, comprising coating at least portions of a soft, pliable, reinforcing material with an adhesive, bringing the reinforcing material into contact with one surface of a low density, labile, cured aminoplast resin foam to form a composite structure, applying a substantially uniform compressive force to said composite structure in a direction substantially normal to the plane of the surface contacted by said reinforcing material while subjecting said composite structure to a temperature of between about 125° F. and about 250° F. and maintaining the moisture content of the compressed foam below 10%, said compressive force being of sufficient magnitude to reduce the volume of said foam by about 50% to about 95%, and maintaining compression of the composite structure for at least 2 minutes to achieve substantially simultaneously a permanent set of the foam in its compressed state and bonding of said reinforcing material to the aminoplast resin foam.

5. The method according to claim 4, wherein the surface of said foam opposite the surface contacted by the reinforcing material is contacted by a porous felt-like material when said foam is compressed to maintain the moisture content of the compressed foam below 10%.

6. The method according to claim 4, wherein said aminoplast resin foam is a urea-formaldehyde foam.

7. The method according to claim 4, wherein said adhesive is a latex-base adhesive.

8. The method according to claim 4, wherein said adhesive is a butadiene-styrene-type latex-adhesive emulsion.

9. The method according to claim 4, wherein said adhesive is a plasticizer-modified butadiene-styrene latex-adhesive emulsion capable of adhesively adhering to said aminoplast resin foam structure and to said reinforcing material at a temperature of from about 180° F. to about 250° F.

10. A method according to claim 4, wherein said reinforcing material is a polyethylene scrim.

11. A method according to claim 4, wherein said reinforcing material is a crosslaid rayon scrim.

12. A method according to claim 4, wherein said reinforcing material is a scrim backed by a layer of nonwoven material.

13. A composite pad adaptable for use as an absorbent bandage and the like, comprising an absorbent layer of aminoplast resin foam compressed from its foamed volume at formation by from about 50% to about 95% under conditions of temperature, time, and moisture content which impart improved softness and hydrophilicity, and a scrim-like reinforcing layer adhesively bonded to one surface of said absorbent layer normal to the direction of compression.

References Cited by the Examiner

UNITED STATES PATENTS

| 2,735,426 | 2/1956 | Claydon | 128—156 |
| 2,962,407 | 11/1960 | Aykanian. | |
| 3,125,621 | 3/1964 | Coppick | 128—296 X |
| 3,228,820 | 1/1966 | Samson | 161—160 X |

ROBERT E. MORGAN, *Acting Primary Examiner.*

RICHARD A. GAUDET, *Examiner.*

L. W. TRAPP, *Assistant Examiner.*